US007475204B2

(12) United States Patent
Buah et al.

(10) Patent No.: US 7,475,204 B2
(45) Date of Patent: Jan. 6, 2009

(54) AUTOMATICALLY MANAGING THE STATE OF REPLICATED DATA OF A COMPUTING ENVIRONMENT

(75) Inventors: Patrick A Buah, Poughkeepsie, NY (US); Thomas V Weaver, Dripping Springs, TX (US)

(73) Assignee: International Business Machines Corporation, Armonk, NY (US)

( * ) Notice: Subject to any disclaimer, the term of this patent is extended or adjusted under 35 U.S.C. 154(b) by 279 days.

(21) Appl. No.: 10/997,743

(22) Filed: Nov. 24, 2004

(65) Prior Publication Data
US 2006/0112244 A1    May 25, 2006

(51) Int. Cl.
*G06F 12/00* (2006.01)
(52) U.S. Cl. ..................... 711/161; 711/156; 711/162
(58) Field of Classification Search ............ 711/156, 711/161, 162
See application file for complete search history.

(56) References Cited

U.S. PATENT DOCUMENTS

| 6,131,148 | A  | * | 10/2000 | West et al. | 711/162 |
| 6,189,079 | B1 | * | 2/2001  | Micka et al. | 711/162 |
| 6,202,085 | B1 |   | 3/2001  | Benson et al. | 709/205 |
| 6,393,485 | B1 |   | 5/2002  | Chao et al. | 709/231 |
| 6,438,705 | B1 |   | 8/2002  | Chao et al. | 714/4 |
| 6,526,419 | B1 |   | 2/2003  | Burton et al. | 707/204 |
| 6,609,213 | B1 |   | 8/2003  | Nguyen et al. | 714/4 |
| 2003/0018701 | A1 |   | 1/2003 | Kaestle et al. | 709/201 |
| 2003/0126388 | A1 | * | 7/2003 | Yamagami | 711/162 |
| 2003/0131051 | A1 |   | 7/2003 | Lection et al. | 709/203 |

FOREIGN PATENT DOCUMENTS

JP       2002251384 A  *  9/2002

OTHER PUBLICATIONS

"IBM eRCMF V2 Implementation Guide," Thomas Luther, Version 0.6, Jan. 13, 2004, pp. 1-159.
"IBM WebSphere Application Server," Version 5, Nov. 13, 2004, pp. 1-40.
"IBM eRCMF V2 User Guide," Thomas Luther, Version 0.1, Jan. 14, 2003, pp. 1-114.

* cited by examiner

*Primary Examiner*—Gary J Portka
*Assistant Examiner*—Yong J. Choe
(74) *Attorney, Agent, or Firm*—Geraldine D. Monteleone, Esq.; Blanche E. Schiller, Esq.; Heslin Rothenberg Farley & Mesiti P.C.

(57) ABSTRACT

The state of data of a communications environment is automatically managed. The automatic management is provided via a facility that automatically obtains the current state of the data and uses that information to place the data in an appropriate state for a selected event to be processed. The data is, for instance, maintained on replicated storage media.

10 Claims, 13 Drawing Sheets

US 7,475,204 B2

AUTOMATICALLY MANAGING THE STATE OF REPLICATED DATA OF A COMPUTING ENVIRONMENT

TECHNICAL FIELD

This invention relates, in general, to data management, and more particularly, to automatically managing the state of data of a communications environment.

BACKGROUND OF THE INVENTION

Data management is an important aspect of the overall management of a computing environment. This is particularly true in those environments that support replicated data.

Replicated data enables an environment to be configured for disaster recovery. In such a configuration, data on a primary site is replicated to a secondary site and is available for use should the primary site become unavailable.

To be able to use the secondary site, it is imperative that the data at that site be appropriate for application access. Currently, there are various facilities used to manage the data at replicated sites, including Peer-to-Peer Remote Copy (PPRC) and the enterprise Remote Copy Management Facility (eR-CMF) offered by International Business Machines Corporation, Armonk, N.Y. These facilities, however, require substantial human intervention. Thus, they are incapable of satisfying stringent recovery time objectives of many modern business enterprises.

Based on the foregoing, a need exists for a data management facility that is automated. In one particular example, a need exists for a data management facility capable of automatically managing replicated storage media.

SUMMARY OF THE INVENTION

The shortcomings of the prior art are overcome and additional advantages are provided through the provision of a system for managing data of a communications environment. The system includes, for instance, automatically obtaining a state of at least a portion of data of the communications environment; and automatically placing the at least a portion of the data in an appropriate state based at least on the obtained state of the at least a portion of data.

In a further aspect of the present invention, a system for managing replicated storage media of a communications environment is provided. The system includes, for instance, obtaining control by an entity of the communications environment to determine whether one or more storage media of the replicated storage media are in an appropriate state to allow at least one application access and data replication; automatically obtaining by the entity a state of the one or more storage media; and automatically placing the one or more storage media in the appropriate state to allow the at least one of application access and data replication, the automatically placing employing at least the obtained state of the one or more storage media.

Computer program products corresponding to the above-summarized systems are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

Figure 1:
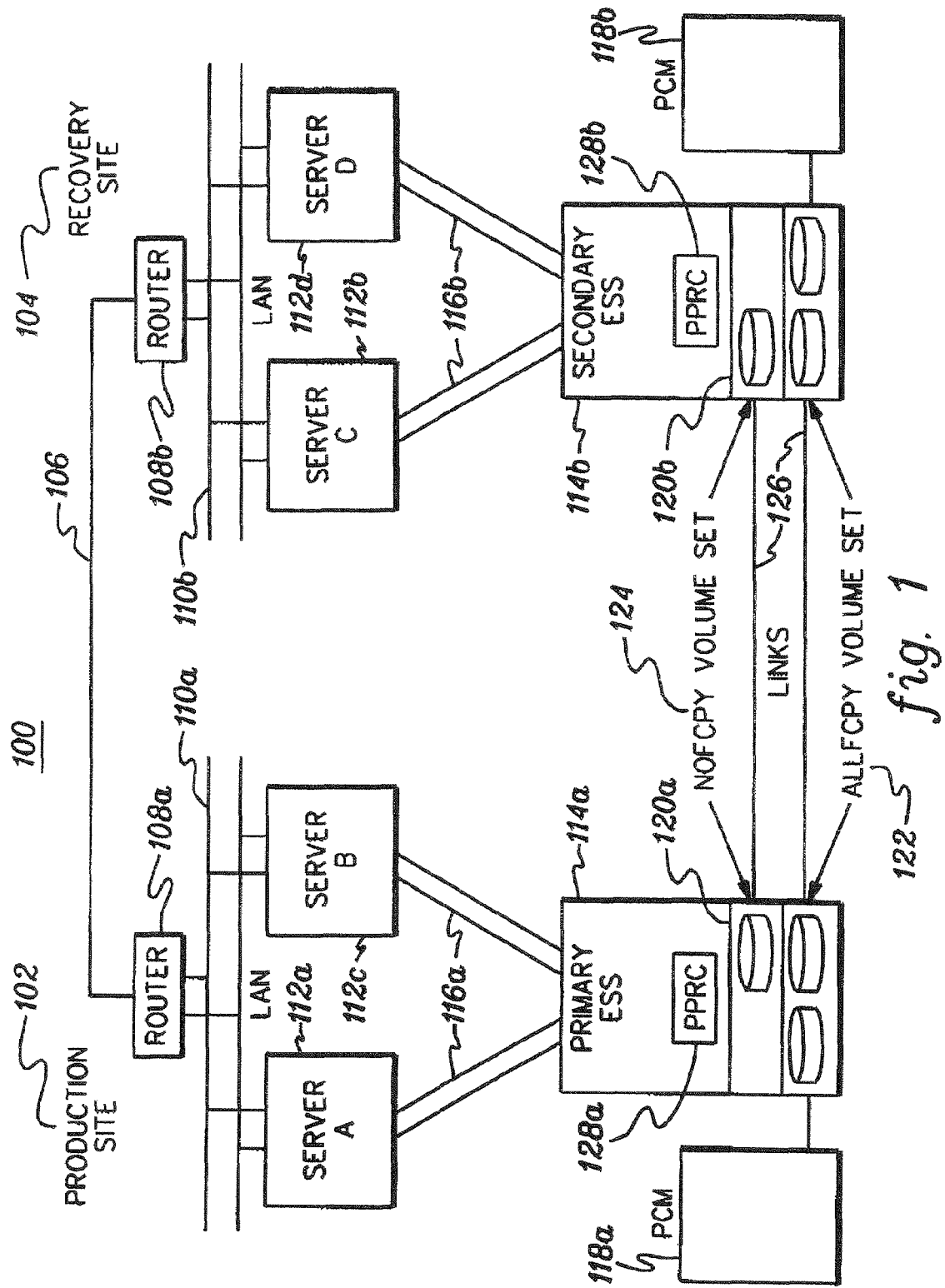
FIG. 1 depicts one embodiment of a communications environment incorporating and using one or more aspects of the present invention.

In accordance with an aspect of the present invention, a capability is provided for automatically managing the state of data. As one particular example, a capability is provided for automatically managing the state of mirrored data maintained on replicated storage media, such as mirrored disk volumes.

The managing capability of one or more aspects of the present invention can be employed in many communications environments, including, for instance, in wide-area cluster environments. Although a wide-area cluster environment is described herein, one or more aspects of the present invention are not limited to such an environment, but can be incorporated and employed in many types of environments, including non-clustered environments.

One embodiment of a communications environment incorporating and using one or more aspects of the present invention is described with reference to FIG. 1. In this example, the communications environment is a wide-area cluster environment 100 that provides for disaster recovery by having, for instance, a production site 102 and a recovery site 104 coupled via a wide-area network (WAN) 106. Production site 102 includes, in one embodiment, a router 108a, which is coupled via WAN 106 to a router 108b of the recovery site. Router 108a is further coupled to a local-area network 110a facilitating the coupling of a plurality of servers, such as Server A 112a and Server B 112c. Servers 112a and 112c are highly-available servers and may include Intel-based servers, UNIX-based servers, and/or zSeries and iSeries servers offered by International Business Machines Corporation, Armonk, N.Y., to name a few. The servers may be homogeneous and/or heterogeneous to one another and more or less than two servers may be included in the production site.

Servers 112a and 112c are coupled (e.g., directly attached) to a storage subsystem 114a via a connection 116a, such as a fiber channel or SCSI (Small Computer System Interface) connection. In this particular embodiment, the servers (e.g., local nodes) are coupled to the local storage subsystem and do not have access to geographically separated remote storage subsystems.

One example of storage subsystem 114a is the Enterprise Storage Server (ESS) offered by International Business Machines Corporation, Armonk, N.Y., an embodiment of which is described in "IBM TotalStorage Enterprise Storage Server Implementing ESS Copy Services In Open Environments," IBM Publication No. SG24-5757-04, July 2004, which is hereby incorporated herein by reference in its entirety. Since this storage subsystem is within the production site of the environment, it is considered the primary storage subsystem. (IBM, zSeries, iSeries and Enterprise Storage Server are registered trademarks or trademarks of International Business Machines Corporation, Armonk, N.Y. Other names used herein are registered trademarks or trademarks of International Business Machines Corporation or other entities.)

Similarly, recovery site 104 includes a local-area network 110b coupled to router 108b and a plurality of servers, such as Server C 112b and Server D 112d. Again, in This example, servers 112b and 112d are highly-available homogeneous and/or heterogeneous servers, and the recovery site may include more or less than two servers. The servers are coupled to a storage subsystem 114b (e.g., the Enterprise Storage Server) via a connection 116b (e.g., a fiber channel or SCSI connection). This storage subsystem is considered the secondary storage subsystem, since it is located at the recovery site.

Each storage subsystem includes one or more storage media 120a, 120b, respectively. In this particular example, each storage subsystem includes a plurality of disk volumes, and disk volumes from storage subsystem 114a are logically combined with disk volumes from storage subsystem 114b to provide one or more volumes sets. A volume set is a set of volumes to be managed in a monolithic manner, and each volume set includes one or more volumes from the primary storage subsystem and one or more volumes from the secondary storage subsystem. Each volume of a volume set is of the same type, including, for instance: No flash copy (NOFCPY) indicating that there is a host volume (a volume that applications can directly access) on each site, but no shadow volume (a volume that applications cannot access—it is a backup copy of the data); flash copy (ALLPCPY) indicating that there is a host volume and shadow volume at each site; extended distance with no flash copy (XDNOFCPY) indicating that the volume can support operations over long distances but no flash copy; extended distance with flash copy (XDALLFCPY) indicating that the volume can support operations over long distances and supports flash copy; cascaded volume with flash copy at none of the sites (CASNOFCPY) indicating that the volume can be used as a secondary in one relationship and a primary in another relationship, but does not support flash copy; or cascaded volume with flash copy at the specified sites (CASSITE {sitex . . . sitey}FCPY) indicating that the volume can be used as a secondary in one relationship and a primary in another relationship and does support flash copy. In this example, two volume sets support flash copy 122 and one volume set does not 124.

Executing within each storage subsystem is a Peer-to-Peer Remote Copy (PPRC) function 128a, 128b, which is a hardware mirroring function that allows the mirroring of data from disk volumes at one geographic site to disk volumes at a second geographic site. Data written by the application server to volumes at one site (the source volumes) is mirrored to the volumes at the opposite site (the target volumes) via links 126 (e.g., ESCON or Fiber Channel links, as examples). During normal operation, the target volumes are inaccessible to the servers at that site to prevent unintentional data corruption. In the event of a failure at the production site, PPRC suspends mirroring and makes the target volumes available for read/write access. While the mirror is suspended, PPRC tracks the new writes, and resynchronizes the changed data when the mirror can be safely re-established. PPRC is further described in the following U.S. patents: U.S. Pat. No. 6,131,148 entitled "Snapshot Copy Of A Secondary Volume Of A PPRC Pair," West et al., issued Oct. 10, 2000; U.S. Pat. No. 6,189,079 B1 entitled "Data Copy Between Peer-To-Peer Controllers," Micka et al., issued Feb. 13, 2001; and U.S. Pat. No. 6,526,419 B1 entitled "Method, System And Program For Remote Copy In An Open Systems Environment," Burton et al., issued Feb. 25, 2003, each of which is hereby incorporated herein by reference in its entirety.

In one embodiment, to manage and control PPRC in open system environments, the Enterprise Storage Server provides an ESS Copy Services web user interface and an ESS command line interface. Copy services is described further below.

Figure 2:
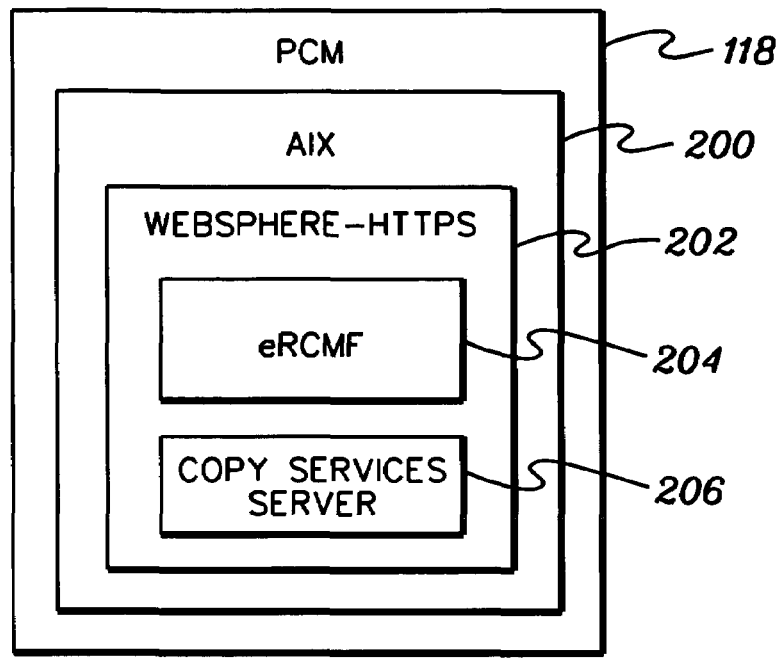
FIG. 2 depicts one example of further details of a Productivity Center Machine of FIG. 1, in accordance with an aspect of the present invention.

Storage subsystem 114a is also coupled to a dedicated server 118a, referred to herein as a Productivity Center Machine (PCM). Likewise, storage subsystem 114b is coupled to a dedicated server 118b, referred to as a Productivity Center Machine. (Servers 118a, 118b are generally denoted 118 herein.) One embodiment of server 118 is described with reference to FIG. 2.

Server 118 is, for instance, a dedicated physical server (or logically partitioned server—LPAR), such as an RS/6000 or pSeries server offered by International Business Machines Corporation, Armonk, N.Y. Server 118 executes an operating system 200 (FIG. 2) (e.g., AIX) and, in one example, a WebSphere software platform 202 employed to run various facilities used in replicating data. These facilities include the enterprise Remote Copy Management Facility (eRMCF) 204 and a Copy Services function 206, offered by International Business Machines Corporation, Armonk, N.Y. One example of WebSphere is described in IBM WebSphere Application Server, Version 5, Servers, 2002, available with WebSphere, which is hereby incorporated herein by reference in its entirety. Further, one example of eRCMF is described in "eRCMF V2 User Guide," Thomas Luther, Version 0.1, Jan. 14, 2003, and in "eRCMF V2 Implementation Guide," Thomas Luther, Version 0.6, Jan. 13, 2004, both of which are available with eRCMF, and an example of Copy Services is described in "IBM TotalStorage Enterprise Storage Server Implementing ESS Copy Services In Open Environments," IBM Publication No. SG24-5757-04, July 2004, each of which is hereby incorporated herein by reference in its entirety.

The enterprise Remote Copy Management Facility includes software, as one example, that communicates with copy services server 206 to manage copy services (e.g., the replicating or mirroring of data). ERCMF is set up as, for instance, a multi-site disaster recovery solution for open systems and provides automation for the reparation of inconsistent PPRC pairs (e.g., inconsistent volume pairs). It is a scalable, flexible open systems ESS solution that protects business (data) and can be used for both planned outages (hardware and software upgrades) and unplanned outages (disaster recovery, testing a disaster). It simplifies the disaster recovery implementation and concept. Once eRCMF is configured in the customer environment, it monitors the PPRC states of the specified volumes. ERCMF runs on two dedicated Productivity Center Machines (PCMs), with each PCM running an instance of eRCMF at each site. The instance running on the machine with the primary PPRC copy services server is the active eRCMF, while the one running on the PCM machine with the backup copy services server is the backup eRCMF. The master process running on the active PCM is the interface into the eRCMF to handle both commands and queries from either a command line or socket (from a local process) interface. It also handles commands and queries from the backup eRCMF process (slave process). The purpose of the backup eRCMF is to record and save state information from the master process, so that it can take over for the master process. If the active PCM fails, the master process is switched to the backup PCM.

The enterprise Remote Copy Management Facility facilitates configuration by making it possible to perform PPRC tasks and monitor the states of the volume pairs eliminating the manual PPRC process of defining PPRC tasks from the ESS web interface. Its operation, however, requires significant human involvement. When used with PPRC, the enterprise Remote Copy Management Facility constitutes a tier 4 and tier 6 disaster recovery solution. It is not capable, however, of meeting the ever more stringent recovery time objectives of most modern enterprises, such as finance, commerce, inventory management, etc. Such business environments require a fully automated recovery capability that provides a tier 7 solution—application availability. The limitation of the enterprise Remote Copy Management Facility arises because although eRCMF maintains the volume pair states, it has no knowledge of what happens at the server level.

In order to overcome the deficiencies of eRCMF, a facility, referred to herein as the Automation Management Interface (AMI), is provided that enables the automation of the managing of the state of data, including the obtaining of data state (e.g., the current state) and placing the data in an appropriate state based on the obtained state information. The Automation Management Interface includes a plurality of application programming interfaces (APIs) employed to ensure that the state of the data (e.g., the mirrored disk volumes) matches that of an application desiring to use the data. That is, AMI ensures that the data is available when an application, running at either site, needs to access it.

Figure 3:
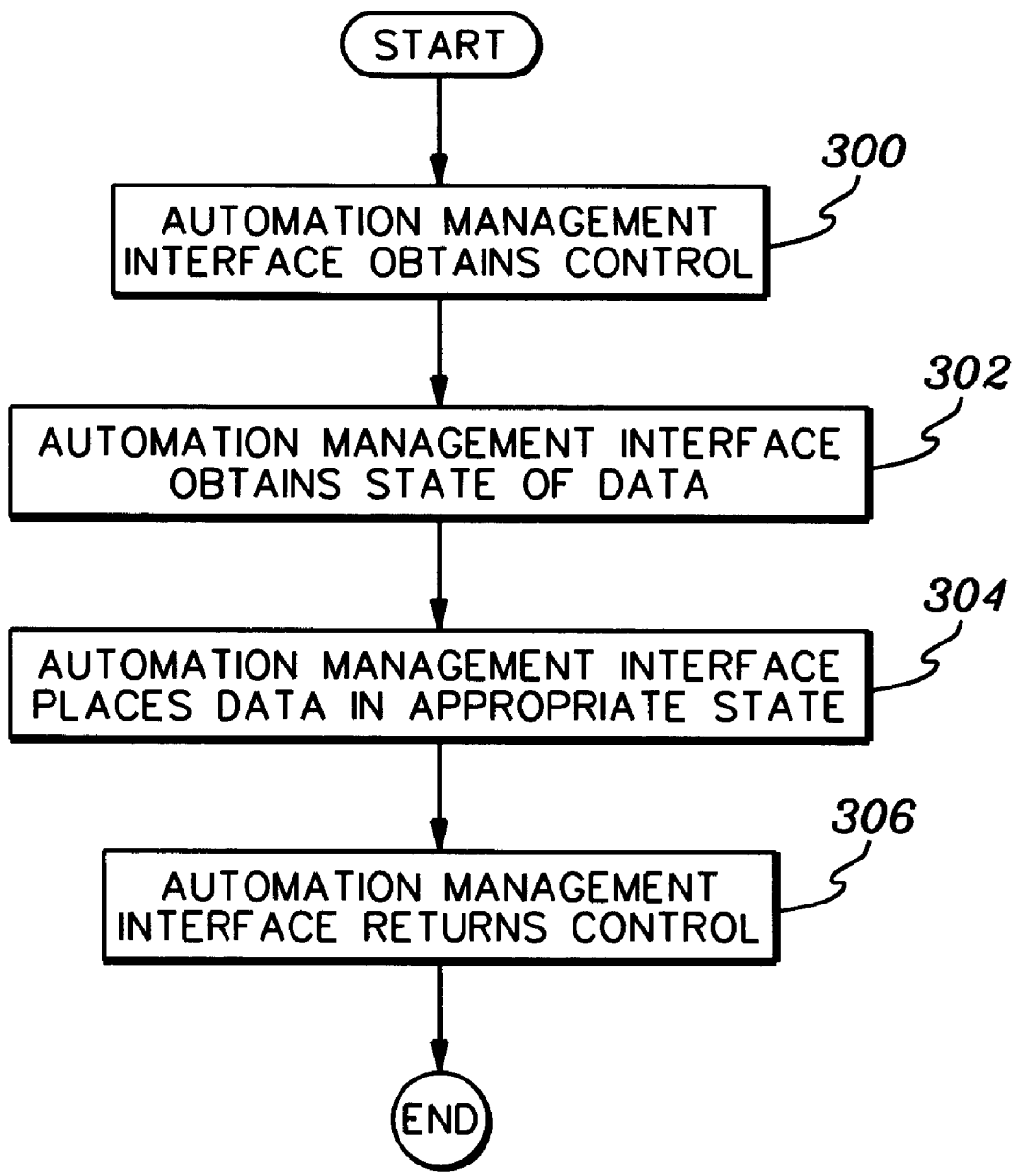
FIG. 3 depicts one embodiment of the logic associated with automatically managing the state of data, in accordance with one or more aspects of the present invention.

One embodiment of the logic associated with the Automation Management Interface is described with reference to FIG. 3. Initially, the Automation Management Interface obtains control from another entity of the communications environment, STEP 300. In response to receiving control, the Automation Management Interface obtains the state of selected data, STEP 302. In one example, this is accomplished by executing query commands. Based on the obtained state of the data, the Automation Management Interface places the data in an appropriate state (i.e., e.g., a state to enable a selected operation, such as access or mirroring, to be performed using the data), STEP 304. For instance, an AMI state machine is executed to invoke one or more appropriate commands, based on the obtained state, to place the data in the appropriate state. The appropriate states for given conditions are stored in the logic of AMI. Subsequent to invoking the one or more commands and prior to returning control, AMI determines whether the data is now in the appropriate state. If not, it invokes one or more additional commands to ensure the data is placed in the appropriate state. Thereafter, the Automation Management Interface returns control to the entity from which it gained control, STEP 306.

The Automation Management Interface may be used in many environments including, but not limited to, the wide-area network cluster environment described herein. In this environment, the Automation Management Interface is a layer between the cluster software and eRCMF. For instance, as described in FIG. 4, an instance of the Automation Management Interface 400a is layered between a cluster resource manager 402a and an instance of the enterprise Remote Copy Management Facility 404a. In this particular example, the cluster resource manager and the Automation Management Interface execute in a server, such as Server A and/or Server B of the production site (FIG. 1), and eRCMF executes in Productivity Center Machine 118a (FIG. 1).

Cluster resource manager 402a is further coupled to another cluster resource manager 402b at the recovery site via a wide-area network 406. Cluster resource manager 402b is also coupled to an instance of the Automation Management Interface 400b, both of which execute on a server at the recovery site. Moreover, Automation Management Interface 400b is coupled to an instance of the enterprise Remote Copy Management Facility 404b, which is executing in the PCM coupled to the server.

Figure 4:
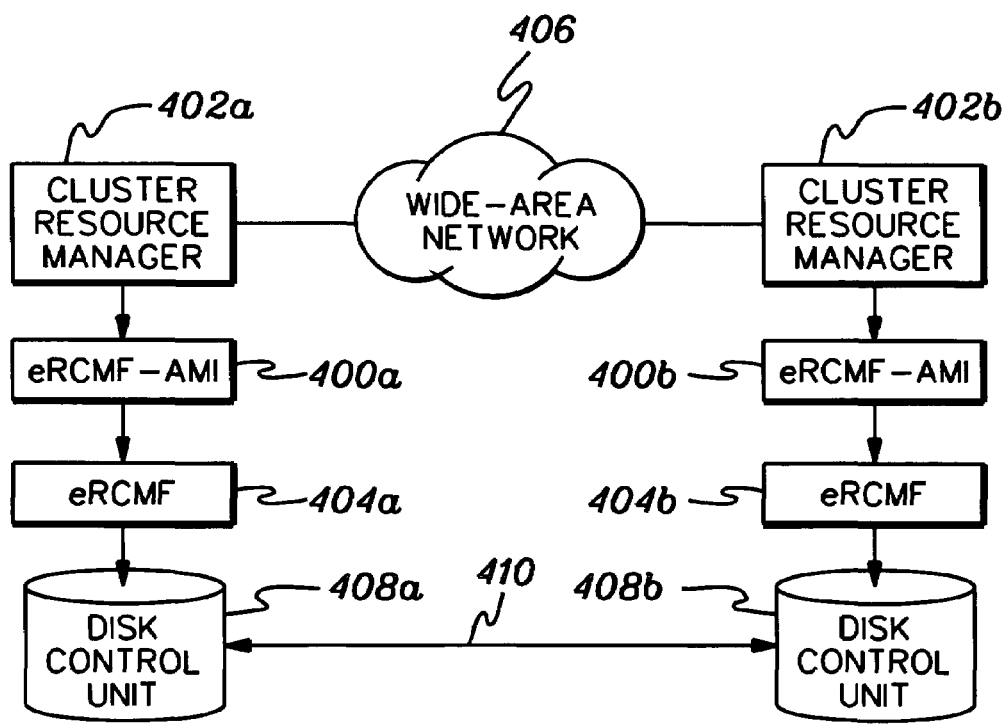
FIG. 4 depicts one example of an architectural overview of an Automation Management Interface in a wide-area cluster infrastructure, in accordance with an aspect of the present invention.

Also shown in FIG. 4 is a disk control unit 408a, which is maintained in primary storage server 114a of FIG. 1, and a disk control unit 408b, which is maintained in secondary storage server 114b of FIG. 1. Disk control units 408a and 408b are coupled to one another via one or more links 410 to enable the mirroring of data, as one example.

In this clustered environment, the AMI process is completely transparent to the cluster software and operates underneath the volume management layer. As one example, prior to restarting an application on the recovery site, which in this context includes not only the application that end users interact with, but also the dependent database software or other middleware, AMI is called by the cluster software to ensure that the backup disk volumes are in the appropriate state to allow application access. Additionally, AMI uses eRCMF to discern the state of the storage server at the primary site, and directs the instance of PPRC at the backup site to either track changes, if the primary storage server is unavailable, or reflect them back, if the primary storage server is available.

One responsibility of the Automation Management Interface is to expose the underlying eRCMF disk storage management component to the upper cluster layer as a replicated resource. A replicated resource is a resource type that has a primary and secondary instance corresponding to the source and target of data copies that are replicated across two locations. Resources of this type include IBM GeoRM or ESS PPRC data replication technologies. Resources such as file systems, IP addresses or application servers managed by a cluster software are normally grouped into what is referred to as a resource group. To enable its management by the cluster, a replicated resource is also to be included in a resource group. When eRCMF volume pairs are included in a cluster resource group definition, the resource group members are considered to be dependent resources.

The cluster software is to expose the states of the resource groups to be either primary or secondary to indicate the site they are currently activated on. The eRCMF replicated resource is activated on the site where the resource group including that resource is currently online. The resource group policy processing component or resource manager of the cluster software administers the resource policies pertaining to the starting, stopping and moving of resource groups. That is, it makes the decision as to where a particular resource group is to be activated or deactivated. This upper level cluster event manager provides a list of resource groups which have replicated resources defined as members of the resource group to the cluster eRCMF interface (i.e., AMI) to act upon. For each replicated resource definition, the resource group policy applies a specified inter-site policy to determine which node or site should bring the specified dependent resources online. This information is used by the decision layer state machine of AMI to decide what action to take on the underlying eRCMF-protected disk volumes. After processing the eRCMF replicated resources, a result is then communicated back to the cluster software which then takes the appropriate action. The action taken by the Automation Management Interface on behalf of the cluster software depends, for instance, on the state of the disk volumes that eRCMF exposes to the interface.

A state of an eRCMF protected disk volume defines the current situation of each volume set and is defined by the location of the production site and the state of the PPRC pairs. (A volume set includes one or more pairs of volumes, and a volume pair typically includes one volume from the production site and another volume from the backup site.) Examples of the internal states that a volume set may be in include the following:

sure the hdisk/vapath is available 508, vary on the volume group 510 (e.g., a set of physical volumes that the operating system treats as a contiguous, addressable disk region, where a physical volume is a single physical disk), mount the file system 512, and start one or more applications 514.

Similarly, when a resource group is to be varied offline 520, the cluster software invokes the Automation Management Interface 522, which contacts eRCMF 524 to determine the state of the data 526. Based on the state of the data, AMI places the data in the appropriate state, and then returns control to the cluster. The cluster is then able to stop the one or more applications 528, unmount the filesystem 530, vary off the volume group 532, and make the disk unavailable 534.

Further details regarding online processing is described with reference to FIG. 6. In this particular example, the online processing is described with reference to a node joining the cluster. When a node joins the cluster, the node in the cluster that is to acquire ownership of a resource group runs an online process. The online processing is also invoked, however, whenever a resource group is to be varied online.

Figure 6:
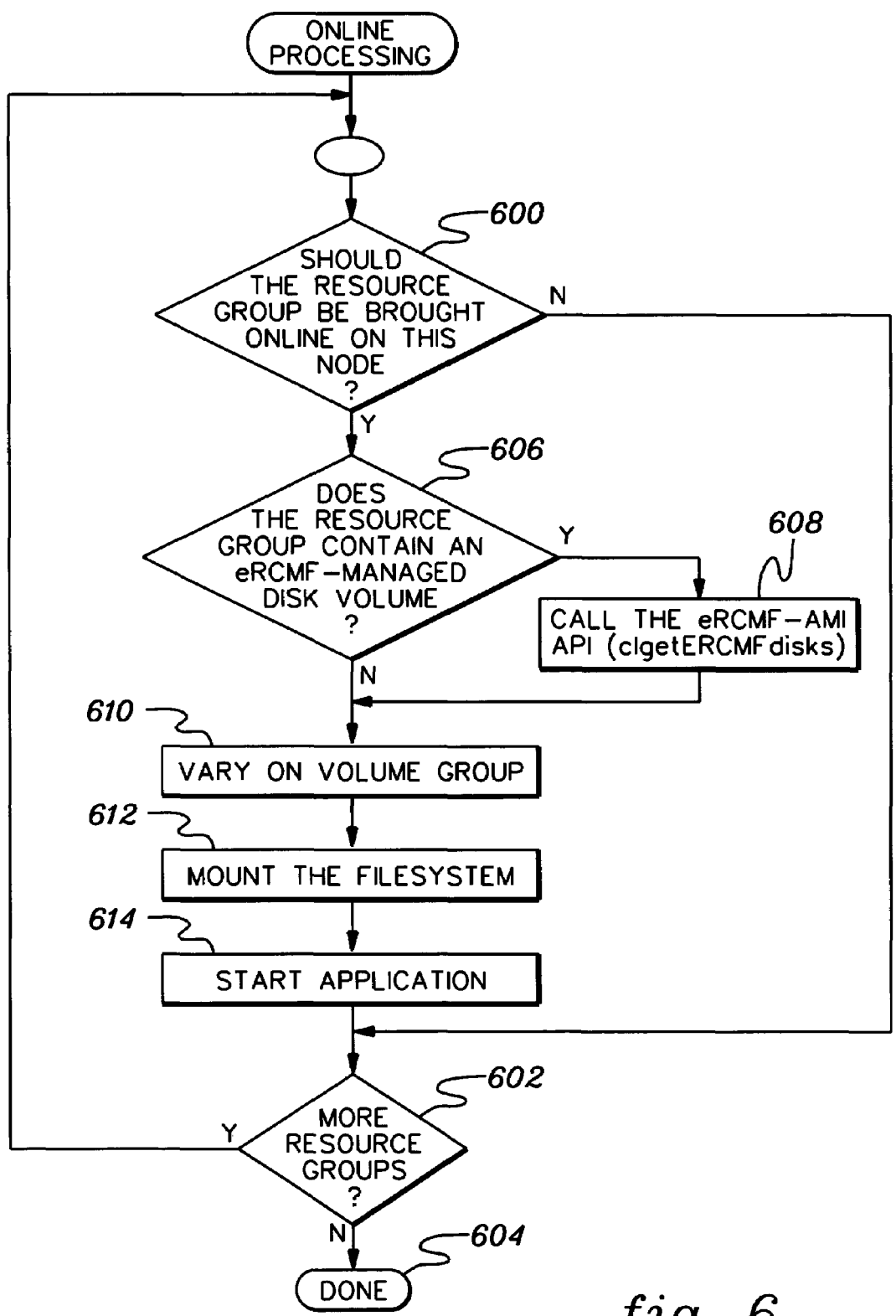
FIG. 6 depicts one embodiment of the logic associated with resource group online processing, in accordance with an aspect of the present invention.

Referring to FIG. 6, initially, a determination is made as to whether a selected resource group is to be brought online on

| | |
|---|---|
| InSync | The PPRC pairs are InSync. This is a preferred state to be in; |
| SplitSite | PPRC pairs are consistent in and of themselves, but not necessarily with one another. The state achieved after a site split; |
| OutOfSync | Sites not consistent with one another. Backup site not consistent within itself. Operations to resynchronize the sites may be in progress; |
| OutOfSync-Freeze | Errors occurred while attempting a freeze. eRCMF is not sure whether a split was successful or not. The actual state could be OutOfSync or SplitSite; |
| RecoverySiteActive | Sites are not consistent with one another. Recovery has been invoked. No attempt has yet been made to resynchronize the sites; |
| Swapping | This is a transitory state used to swap the production and backup sites from the InSync state, while the servers are down; |
| XDMode | Extended Distance copy (PPRC-XD) is being used; |
| Splitting | PPRC-XD has been converted to Full Sync, pairs will suspend once synchronized. This is valid in XD type volume sets; |
| ForceRecover | Special PPRC mode set up for out of sync copy back when servers have failed. Valid for volume sets of type NOFCPY, XDNOFCPY, or CASNOFCPY; |
| RecoverSite-ForceSwap | Special PPRC mode set up for out of sync copy back when servers have failed. Valid for volume sets of type NOFCPY, XDNOFCPY, or CASNOFCPY; |
| XDMode-OutOfSync | XDMode, however at least one PPRC pair is either suspended or not paired. |

The above states are presented by eRCMF to AMI, in response to an AMI query, but are not known by the cluster software.

Figure 5:
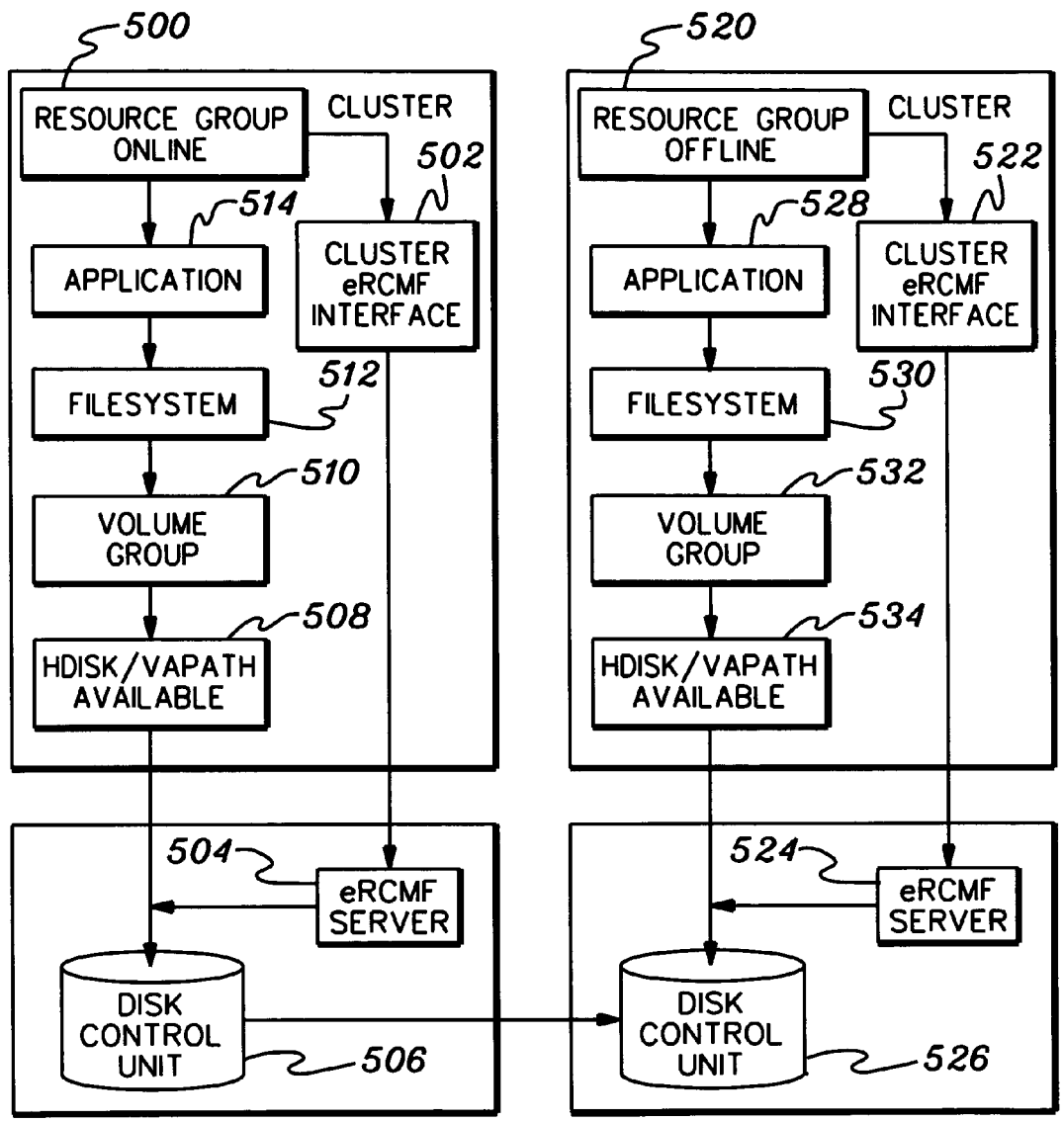
FIG. 5 depicts an overview of the interaction of various entities used to vary a resource group online or offline, in accordance with an aspect of the present invention.

Generally, a cluster resource group that includes one or more volume pairs can be in one of two states at any time on a cluster node (e.g., server). These states include online specifying that the resource group is activated on that node, and offline indicating that the resource group is acting in a backup capacity on that node. An overview of online and offline processing for a resource group is depicted in FIG. 5. When a resource group is to be brought online 500, the cluster software (e.g., the cluster resource manager) invokes Automation Management Interface 502 (also referred to herein as the cluster eRCMF interface), which contacts eRCMF 504 to determine the state of the data 506, and uses that information to place the data in the appropriate state (e.g., invokes the appropriate commands). When this is completed, AMI returns control to the cluster software which can then make this node, INQUIRY 600. If the resource group is not to be brought online on this node, then a further determination is made as to whether there are more resource groups to be processed, INQUIRY 602. If not, then processing is complete, STEP 604. However, if there are more resource groups to be processed, then processing continues with INQUIRY 600. If a resource group is to be brought online, then a further determination is made as to whether the resource group includes an eRCMF managed disk volume, INQUIRY 606. In one example, this determination is made by querying the definitions of the resource group. If the resource group includes an eRCMF managed disk volume, then the cluster resource manager calls the Automation Management Interface to facilitate management of the state of the data (e.g., the disks), STEP 608. As one particular example, an application programming interface (API) of the Automation Management Interface, referred to as clgetERCMFdisks, is invoked.

The clgetERCMFdisks API is employed to determine the state of one or more volume sets associated with this resource group and to place the one or more volume sets in an appropriate state for bringing the resource group online. One embodiment of the syntax of the clgetERCMFdisks API is as follows:

| clgetERCMFdisks <List of volume sets> <Local cluster site> <State of Remote Cluster> | |
|---|---|
| List of volume sets - | The list of volume sets that are to be processed by the AMI; |
| Local cluster site - | The name of the cluster site where the resource group is coming online; |
| State of Remote Cluster - | Indicate whether the remote cluster is up or down. |

With the clgetERCMFdisks API, the names of the volume sets are provided and the preferred direction of mirroring is obtained, in order to inform eRCMF of what disks to make accessible to the cluster when the cluster node comes online. AMI ensures that the mirrored disk volumes are in the appropriate state for the cluster software to proceed to vary on the volume group on top of the disks. This process is transparent to the cluster software and proceeds underneath the volume groups.

The Automation Management Interface executes a state machine to place the disks in their appropriate state. One example of the pseudocode of the state machine executed by the Automation Management Interface in the clgetERCMFdisks API is provided below:

With the above pseudocode, AMI submits a query to eRCMF to determine the state of a volume set, as well as the source and target of the volume set. Then, based on the provided state, various processing is invoked. For instance, if the production site is the local site name (i.e., where the resource group is being brought online) and the state of the volume set is InSync, then nothing is done, unless the volume set is of the extended distance type. If the volume set is of the extended distance type, then an async command is executed. This includes AMI instructing eRCMF to run the async command which is understood by eRCMF. Examples of the various commands executed by eRCMF are described in "eRCMF V2 User Guide," Thomas Luther, Version 0.1, Jan. 14, 2003, and in "eRCMF V2 Implementation Guide," Thomas Luther, Version 0.6, Jan. 13, 2004, provided with eRCMF, each of which is hereby incorporated herein by reference in its entirety.

Figure 7:
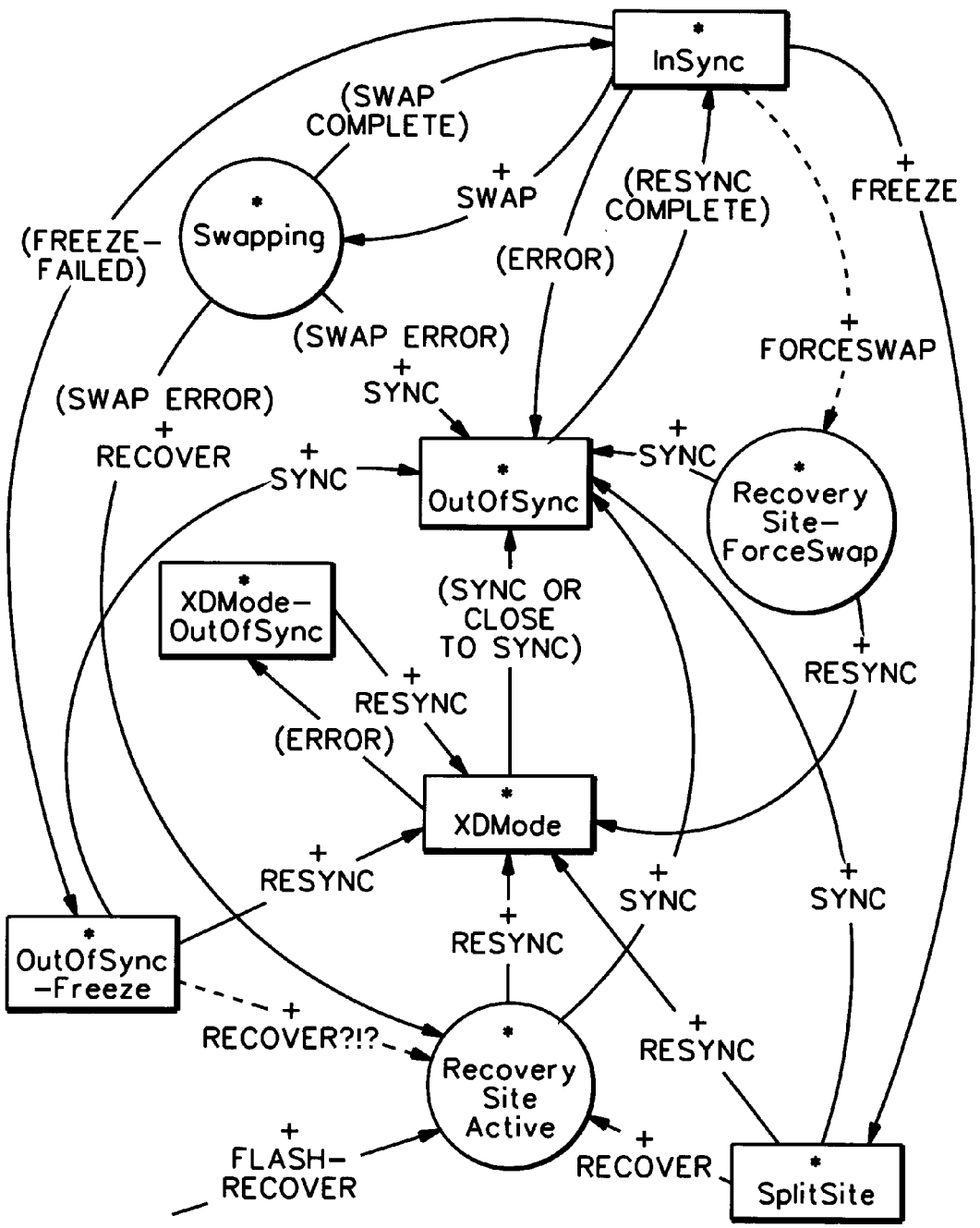
FIG. 7 depicts one example of a synchronous volume set state diagram, in accordance with an aspect of the present invention.
Figure 8:
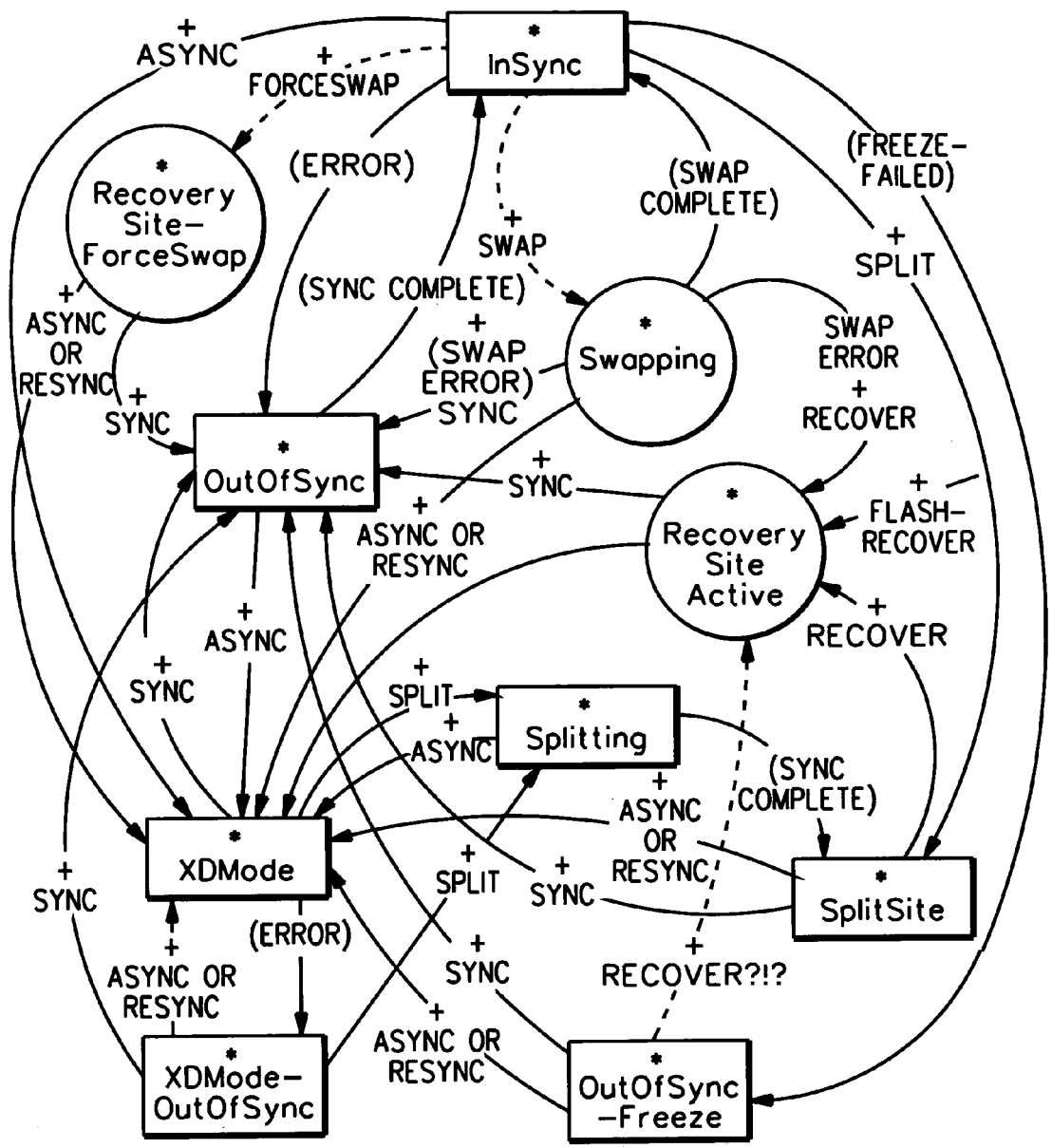
FIG. 8 depicts one example of an extended distance volume set state diagram, in accordance with an aspect of the present invention.

To facilitate placing the volume set in an appropriate state, logic of a state diagram, such as the one depicted in FIG. 7 or FIG. 8 is used by eRCMF, upon invocation by AMI. As examples, FIG. 7 depicts the state diagram for a synchronous volume set, while FIG. 8 depicts the state diagram for an extended distance volume set. In each of these diagrams, an "*" indicates an eRCMF state; a "+" indicates an eRCMF command; the words in parenthesis indicate a condition; and the circle with the arrow to it indicates a production change.

The logic of the state diagram is used internally by eRCMF when AMI invokes a command. For example, if AMI receives an indication that the current state of the volume set is SplitSite, then it instructs eRCMF to run resync. When eRCMF executes resync, at some point, the state transitions from SplitSite to XDMode (see FIG. 7), then from XDMode to OutOfSync and eventually to InSync.

When eRCMF is finished executing the resync command and/or during execution of the command, AMI ensures that

```
{
A query is submitted to the eRCMF daemon running on the eRCMF server machine.
The information requested from the daemon are the   1) State of the volume set;
                                                    2) Production Site (source of
                                                       volume set);
                                                    3) Recovery Site (target of the
                                                       volume set).
if (ProductionSite = LOCALSITENAME) {
switch( VolumeSet State ){
        case InSync:       if the VolumeSet is of the Extended Distance type, then run
                               async command, else do nothing
        case OutOfSync:    run resync command
        case XDMode:       do nothing
        case SplitSite:    execute the resync VolumeSet command
        case RecoverySiteActive:   if the remote cluster is up, then run the sync
                                       command,
                                   else do nothing
        case Swapping:     execute the resync VolumeSet command
        ...
        Default: Exit with error
    }
{
else
{
switch( VolumeSet State ){
        case InSync: forceSwap, if remote site servers are down, otherwise swap
        case OutOfSync:    recover VolumeSet
        case XDMode:       recover VolumeSet
        case SplitSite:    recover VolumeSet
        case RecoverySiteActive: Exit with error
        ...
        ...
        Default: Exit with error
    }
    }
``` the state of the volume set is the appropriate state, which in this example is InSync. If it is the appropriate state, then control is returned to the cluster software.

Returning to FIG. 6, subsequent to executing the AMI API and placing the data in the appropriate state, or if the resource group does not include an eRCMF-managed disk volume, the volume group is varied online, STEP 610, the filesystem is mounted, STEP 612, and one or more applications are started, STEP 614. Thereafter, processing continues with INQUIRY 602.

In addition to online processing, a resource group can be involved in offline processing. The state diagrams used for online processing are also used for offline processing, as well as other processing.

When a node that currently has ownership of the resource group leaves the cluster, the node runs an offline process. Further, an offline process is run any time a resource group is to be varied offline. In accordance with an aspect of the present invention, the Automation Management Interface is called after the volume group defined on the eRCMF-managed volume disks is varied offline. This ensures that the data is in an appropriate state before the resource group can be varied on at the remote site.

Figure 9:
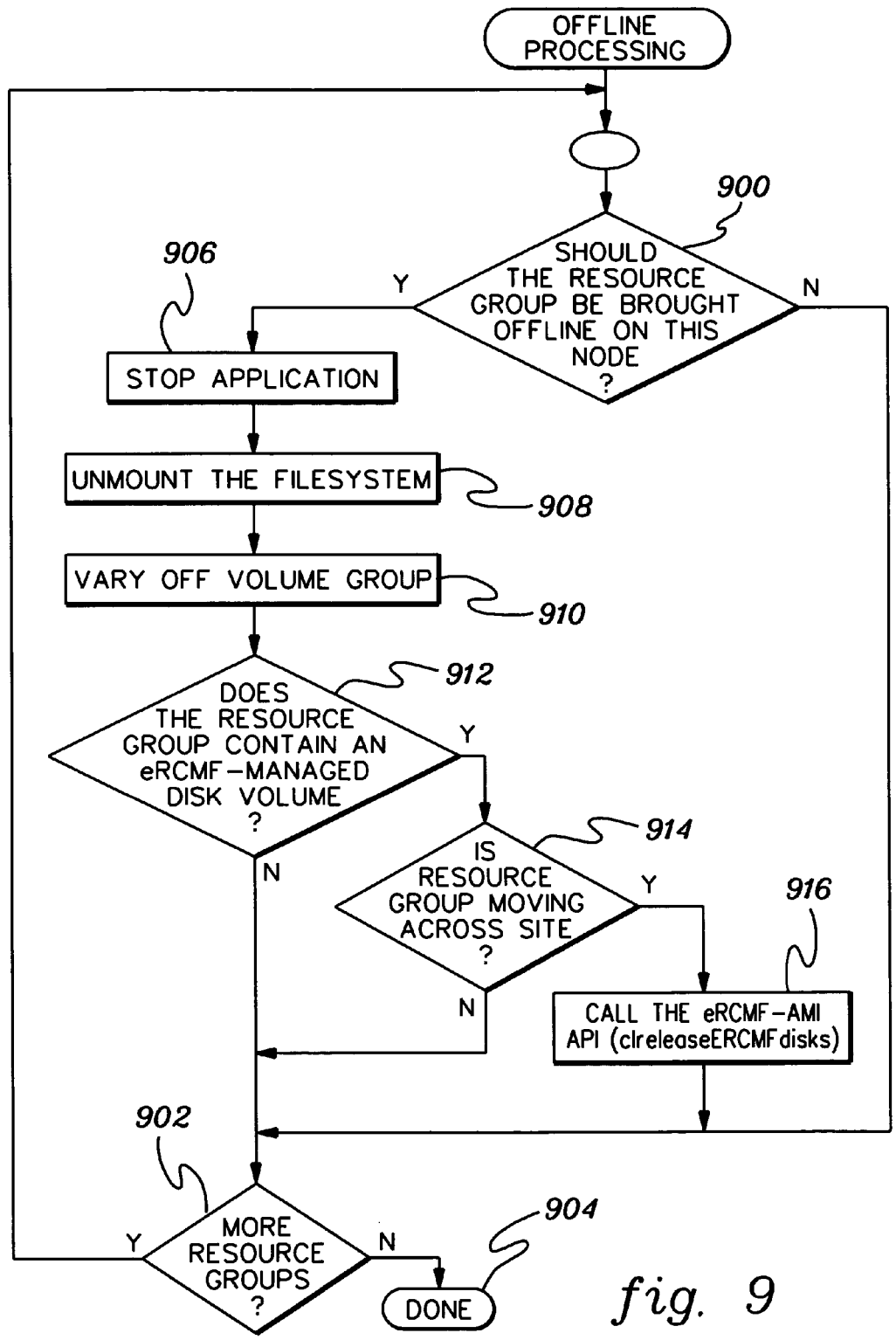
FIG. 9 depicts one embodiment of the logic associated with resource group offline processing, in accordance with an aspect of the present invention.

One embodiment of the logic associated with offline processing is described with reference to FIG. 9. Initially, a determination is made as to whether the resource group should be brought offline on this node, INQUIRY 900. If the resource group is not to be brought offline on this node, then a further determination is made as to whether there are more resource groups to be considered, INQUIRY 902. If there are no more resource groups to be considered, then processing is complete, STEP 904. However, if there are more resource groups to be processed, then processing continues with INQUIRY 900.

If the resource group is to be brought offline, then one or more applications are stopped, STEP 906. Further, the file system is unmounted, STEP 908, and the volume group is varied off, STEP 910. Thereafter, a determination is made as to whether the resource group includes an eRCMF managed disk volume, INQUIRY 912. If the resource group does include such a disk volume, then a further determination is made as to whether the resource group is moving across site, INQUIRY 914. If the resource group is not moving across site or the resource group does not include an eRCFM managed disk volume, then processing continues with INQUIRY 902. However, if the resource group includes an eRCMF managed disk volume that is moving across site, then an eRCMF AMI API, referred to as clreleaseERCMFdisks, is invoked, STEP 916.

The clreleaseERCMFdisks API is employed to determine the state of one or more volume sets associated with the resource group to be moved and to place the one or more volume sets in the appropriate state for the move. Moreover, the clreleaseERCMFdisks API directs eRCMF to stop mirroring or switch the direction of the mirroring of the disk volumes. One embodiment of the syntax of the clreleaseERCMFdisks API is as follows:

clreleaseERCMFdisks <List of VolumeSets> <Local cluster site> <State of Remote Cluster>

| | |
|---|---|
| List of VolumeSets - | The list of volume sets that are to be processed by the AMI; |
| Local cluster site - | The name of the cluster site where the resource group is coming online; |
| State of Remote Cluster - | Indicate whether the remote cluster is up or down. |

One embodiment of the pseudo-code of the state machine executed by the Automation Management Interface in the clreleaseERCMFdisks API is as follows:

```
{
A query is submitted to the eRCMF daemon running on the eRCMF server machine.
The information requested from the daemon are the    1) State of the volume set;
                                                     2) Production Site (source of
                                                        volume set);
                                                     3) Recovery Site (target of the
                                                        volume set).
if(Volume setProductionSite = TARGETSITENAME) {
switch( VolumeSetState ){
        case InSync: Do nothing if LocalSite = EventSite, else swap VolumeSet
        case OutOfSync: sync VolumeSet
        case XDMode: sync VolumeSet if EventSite=LocalSite, Otherwise swap
            VolumeSet
        case SplitSite: Do Nothing
        case RecoverySiteActive: Do Nothing
        ...
        Default: Exit with an error
        }
    {
    else
    {
       Do Nothing
    }
}
```

Subsequent to executing the AMI API and placing the data in the appropriate state, processing continues with INQUIRY 902.

Other processing may also invoke an AMI API. For example, when a remote node joins a cluster after a forceSwap command has been run while the remote cluster was down, an API, referred to a cljoinERCMFcleanup, is invoked. In particular, if a remote cluster node leaves the cluster without varying off the volume group, the persistent reservation is left on the disk while the node is down. The node that acquires the resource group at the backup site initiates a PPRC failover action (i.e., failover performed by PPRC) in order to have write access to the backup disks. The state of the volume sets, after a PPRC failover action is performed, transitions to RecoverySite-ForceSwap. When the original node rejoins the cluster, the PPRC failback process is initiated to resynchronize the disk pairs. This failback process invokes this API.

One embodiment of the syntax associated with the cljoinERCMFcleanup API is, as follows:

--- cljoinERCMFcleanup <List of VolumeSets> <joining node cluster site>

List of VolumeSets - The list of VolumeSets that are to be processed by the AMI.
Joining node cluster site - The name of the cluster site where the resource group is coming online

---

One embodiment of the pseudocode of the state machine executed by the Automation Management Interface in the cljoinERCMFcleanup is as follows:

--- cljoinERCMFcleanup
{
If a remote node joins the cluster
(
    Local node queries the state of the VolumeSets it owns
    If a VolumeSet state is RecoverySiteForceSwap, check to see if there are persistent disk reservations held by the remote node. If so, AMI breaks the disk reservations, by sending a command to the remote node.
    It submits the ercmf resync command
}

---

As indicated in the above pseudocode, if a remote node joins the cluster, then the local node (e.g., AMI) queries the state of the volume sets it owns. If a volume set state is RecoverySite-ForceSwap, then AMI instructs eRCMF to execute the resync command.

Figure 10:
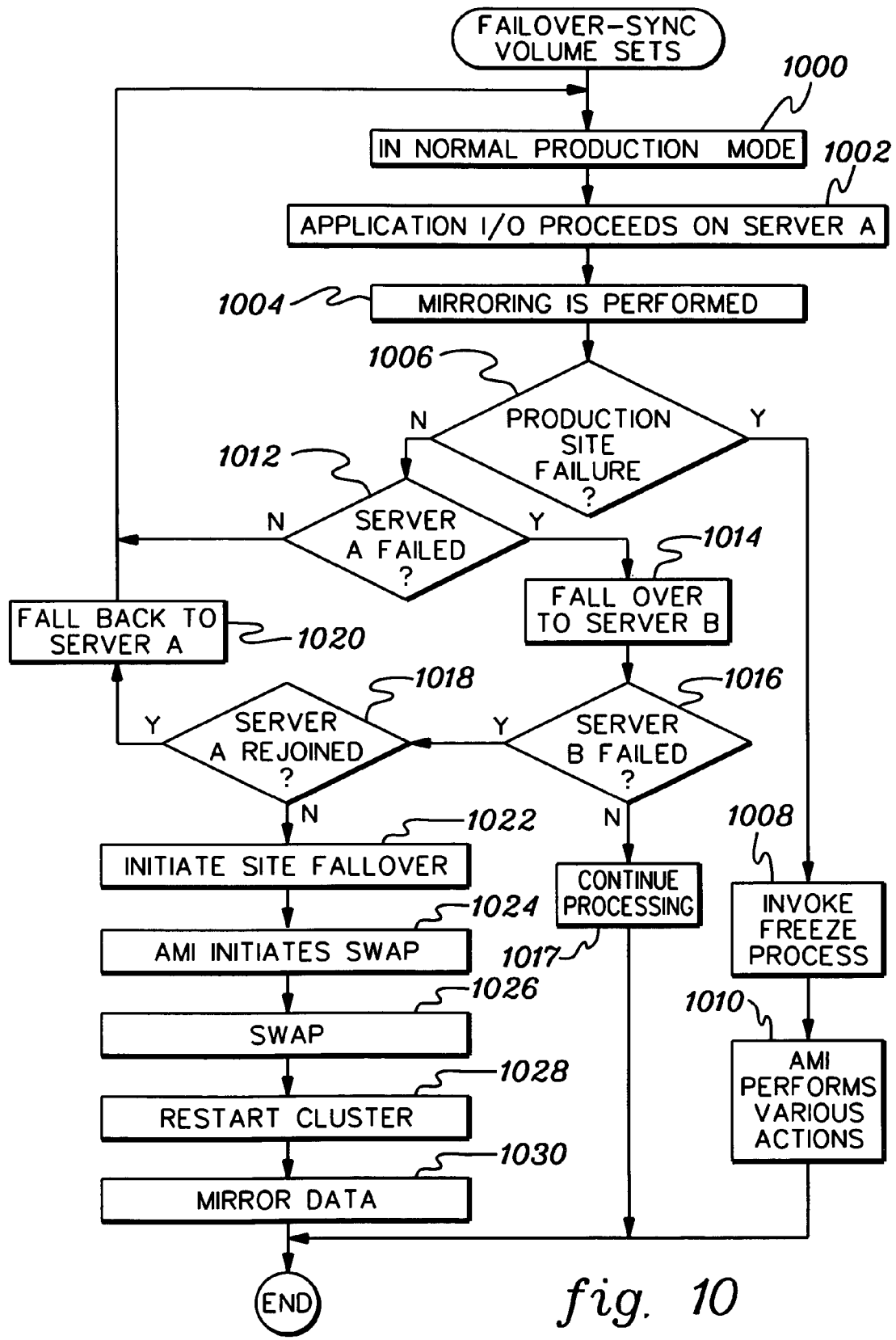
FIG. 10 depicts one embodiment of the logic associated with failover processing for synchronous volume sets, in accordance with an aspect of the present invention.

In addition to the above, there are various wide-area cluster events that employ the Automation Management Interface of one or more aspects of the present invention. Various of these events are described below. These events are described with respect to the type of operation that is being employed, since the processing is different for the different types of operation. One type of operation is a synchronous operation (NOFCPY), in which updates performed on the application site primary volumes are synchronously shadowed onto the secondary volumes at the recovery site. Because this is a synchronous operation, write updates are ensured in both copies before the write is considered to be complete for the application. One type of event to be described for the synchronous volume sets is a cluster failover event. One embodiment of the logic associated with this event is described with reference to FIG. 10.

Figure 11:
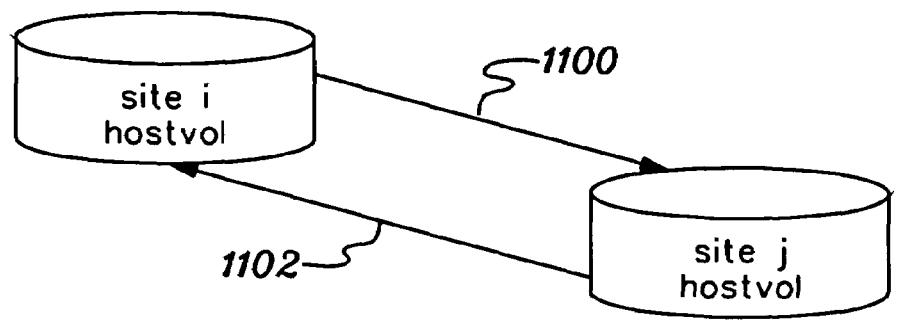
FIG. 11 depicts one example of a volume set no flash copy failover/failback cycle, in accordance with an aspect of the present invention.

In normal production mode, STEP 1000, synchronous volume sets are in PPRC full duplex mode and the automatic site split should be armed (i.e., indicating that a freeze command is to be invoked in certain situations) in eRCMF. The eRCMF-managed PPRC relationships are in the default InSync state. The application input/output (I/O) proceeds on Server A, STEP 1002. Further, eRCMF-managed PPRC mirrors from host volume Hi to Hj, STEP 1004. This mirroring is pictorially illustrated in FIG. 11 at reference number 1100.

Returning to FIG. 10, if there is a production site failure, INQUIRY 1006, then eRCMF invokes a freeze process, STEP 1008. For instance, both the primary and backup eRCMF servers invoke freeze processing. Thereafter, the Automation Management Interface performs various actions, STEP 1010. These actions include, for instance, making the eRCMF server on the backup site the active eRCMF server; issuing an arm and then freeze commands; and issuing a recover site (primary site name) command to eRCMF. This causes eRCMF to query the volume sets to determine the state and to recover the volume sets that had production on the primary site. This places the data and/or other components in a state where the system can start up and recover.

Returning to INQUIRY 1006, if there is not a production site failure, a further determination is made as to whether Server A failed, INQUIRY 1012. In this example, Server A is the primary server that is executing the application I/O. If Server A has not failed, then processing continues in normal production mode. However, if Server A has failed, then the resources owned by Server A fall over to Server B, STEP 1014. In this example, there is no eRCMF action required, since the resources are not moving across sites. The application I/O proceeds on Server B.

If Server B does not fail, INQUIRY 1016, then processing continues on Server B, STEP 1017, unless some other action is taken to move the processing from Server B. However, if a determination is made that Server B has failed, then a further inquiry is made as to whether Server A has rejoined the cluster, INQUIRY 1018. If Server A has rejoined the cluster, then the resources owned by Server B fall back to Server A, STEP 1020. Again, there is no eRCMF action required, since the resources do not move across sites. Processing then continues in normal production mode.

However, if Server B has failed and Server A has not rejoined the cluster, then a site failover of the resources to the backup site is initiated by the cluster, STEP 1022. For instance, the cluster sends control to AMI and AMI initiates an eRCMF action to swap sites on behalf of the cluster, STEP 1024. This involves, for instance, querying the state of the volume sets in the one or more resource groups on the production site and then based on the state of the volume sets, submitting the appropriate commands to put the volume sets into an InSync state, and submitting a swap command to eRCMF to swap the volume sets mirroring directions.

In response to receiving the swap command, eRCMF swaps the production and backup sites, STEP 1026. The cluster then restarts the I/O on Server C or D to Hj, STEP 1028. The eRCMF-managed PPRC now mirrors from host volume Hj to host Hi, STEP 1030. A pictorial illustration of this direction of mirroring is depicted at 1102 in FIG. 11. This completes processing of the cluster failover event.

Figure 12:
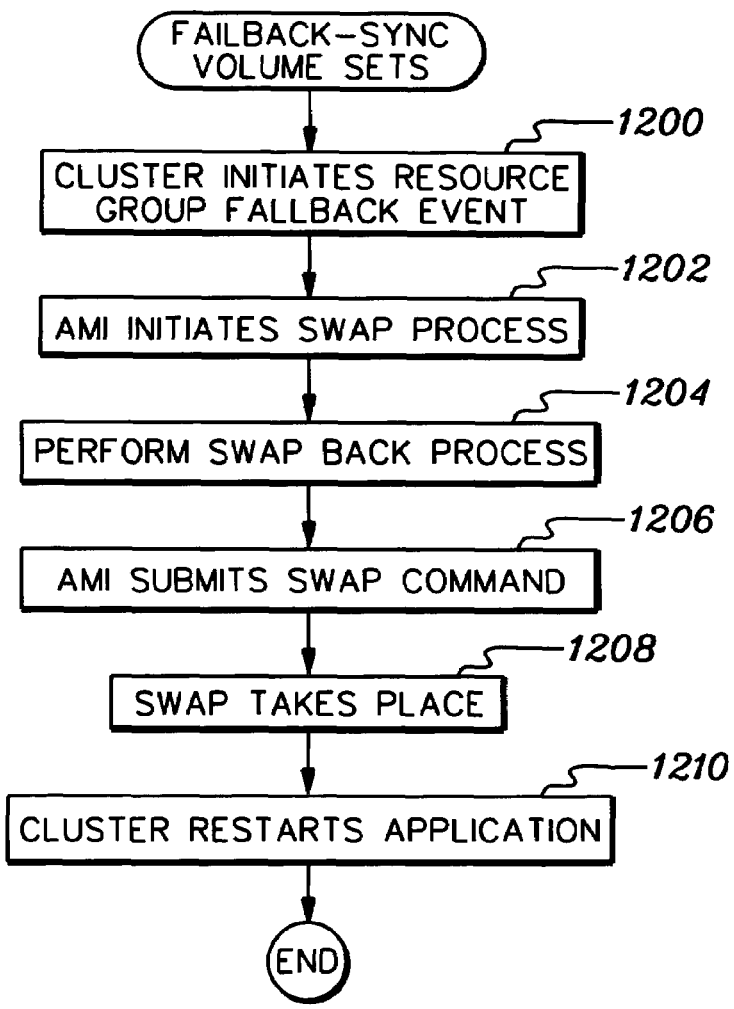
FIG. 12 depicts one embodiment of the logic associated with failback processing for synchronous volume sets, in accordance with an aspect of the present invention.

Another wide-area cluster event for synchronous volume sets is the cluster failback event. In this event, a resource group falls back to a server on the production site. One embodiment of the logic associated with this processing is described with reference to FIG. 12. The cluster initiates a resource group fallback event, STEP 1200. This includes, for instance, stopping one or more applications' I/O, unmounting the file system, varying a volume group offline, and informing AMI to swap the sites. In response to receiving this indication, AMI initiates a swap process, STEP 1202. This includes, for instance, checking the state of the volume sets in one or more resource groups and submitting a resync command back to the original site to eRCMF.

When eRCMF receives the resync command, it performs a swap back process, STEP 1204. The swap back process includes performing a resync action in which logical paths are established and a PPRC full copy is performed. Subsequent to performing this action, AMI receives control again and queries the states. Once the states indicate InSync, AMI submits a swap command to eRCMF to swap the volume sets' production site back to the original site, STEP 1206.

In response to receiving the swap command, eRCMF performs the swap, STEP 1208. This includes, for instance, terminating the PPRC pairs and reestablishing the PPRC pairs in the original direction no-copy.

Thereafter, when InSync again, as determined by AMI, the cluster restarts the applications' I/O on the original site, STEP 1210. This completes the failback processing.

Another type of operation is the PPRC Extended Distance type of operation. In a PPRC Extended Distance (XDALL-FCPY) operation, the PPRC mirrors the primary volumes' updates onto the secondary volumes in a non-synchronous manner, while an application is running. In this way, when in PPRC Extended Distance, the application's write operations are free of the typical synchronous-like overheads. While in this operation, various events may take place. Once such event is a cluster failover event for non-synchronous volume sets.

Figure 13:
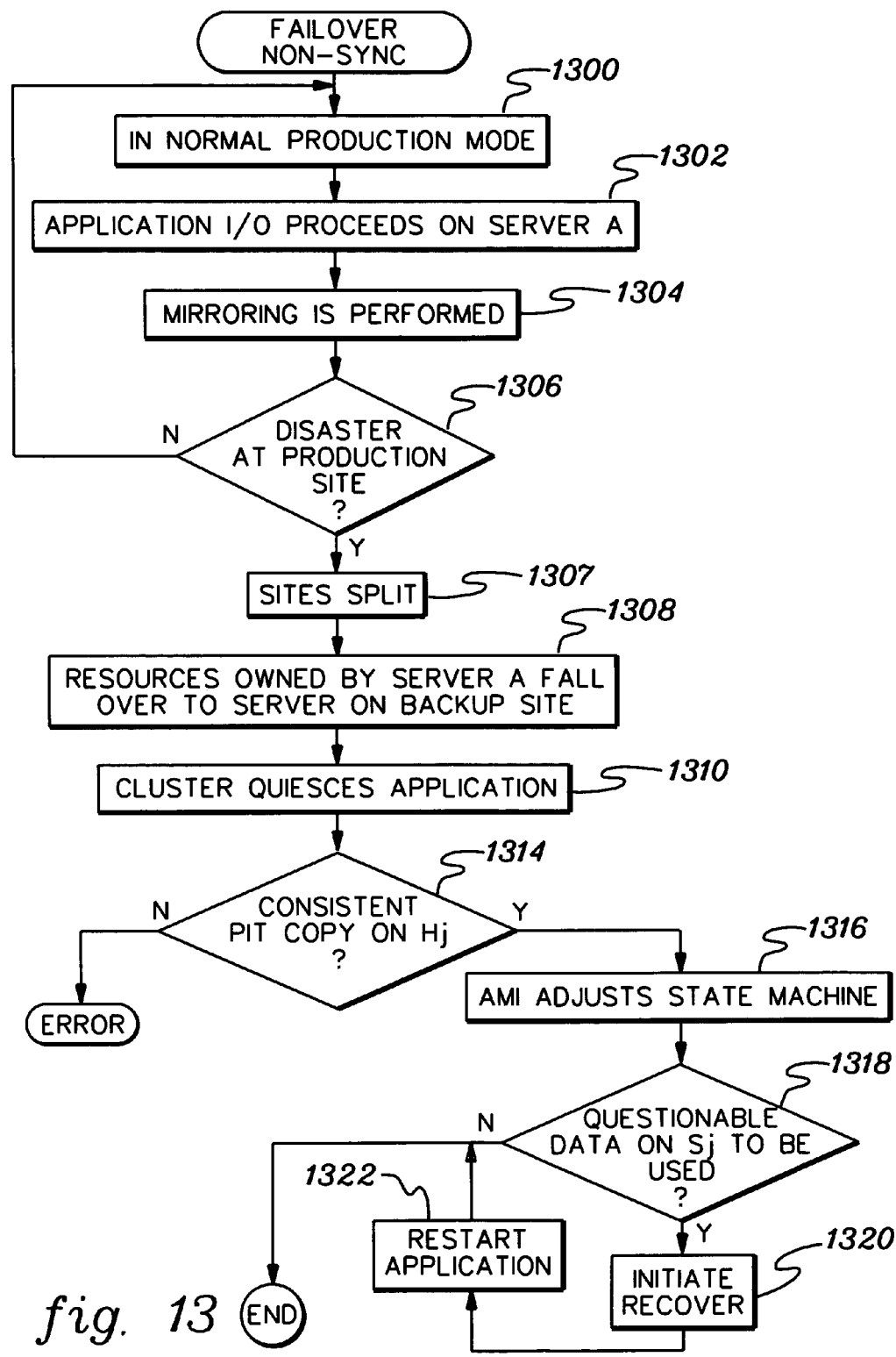
FIG. 13 depicts one embodiment of the logic associated with failover processing for non-synchronous volume sets, in accordance with an aspect of the present invention.
Figure 14:
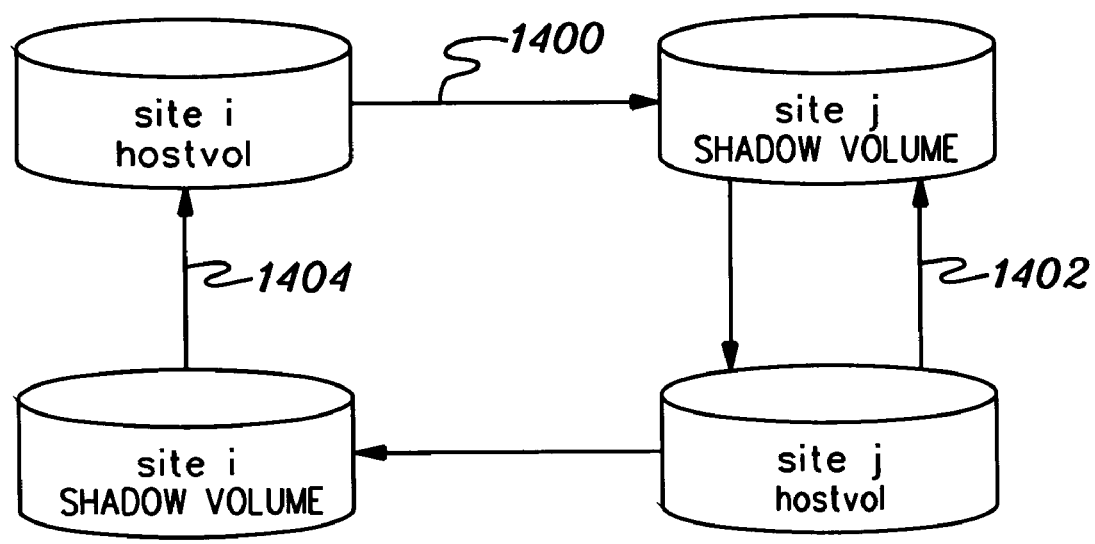
FIG. 14 depicts one example of a volume set flashcopy failover/failback cycle, in accordance with an aspect of the present invention.

One embodiment of the logic associated with processing a cluster failover event for non-synchronous volume sets is described with reference to FIG. 13. In normal production mode, STEP 1300, the Extended Distance volume sets are in PPRC XD mode and the automatic site split is to be armed in eRCMF. The eRCMF-managed PPRC relationships are in the default XD-Mode state. Application I/O proceeds on Server A, STEP 1302, and the eRCMF-managed PPRC mirrors from host volume Hi to Sj, STEP 1304. A pictorial illustration of this mirroring is depicted in FIG. 14 at reference number 1400.

Returning to FIG. 13, if there is no disaster at the production site, INQUIRY 1306, then processing continues in normal production mode, STEP 1300. On the other hand, if there is a disaster at the production site, INQUIRY 1306, then the cluster initiates a site failover. For instance, eRCMF splits the sites by suspending the PPRC volume pairs, STEP 1307. Volume sets in XD-Mode go to XD-Mode OutOfSync. Further, the resources owned by Server A fall over to a server on the backup site (e.g., Server C or Server D), STEP 1308. The particular server in which the resources fall over to depends on the user defined cluster policy.

Thereafter, eRCMF performs site disaster (freeze) processing in which, for instance, the cluster quiesces the application (database) to avoid updates on the primary site, STEP 1310.

Subsequently, a determination is made as to whether the PIT (point in time) copy available on Hj is consistent, INQUIRY 1314. If the PIT copy on Hj is consistent, then AMI adjusts the eRCMF state machine by performing the following actions (STEP 1316):

1. Executes forestate <RecoverySiteActive> command to force the VolumeSet state to RecoverySiteActive.
2. Executes forcesite <site2> command to change the production site of that VolumeSet to the backup site.

Further, a determination is made as to whether the questionable data on Sj is to be used, INQUIRY 1318. If the questionable data is to be used, then AMI initiates recovery of the volume set (e.g., recover VolumeSet), STEP 1320. ERCMF recovers the data by flashcopying the questionable data from Sj to Hj. Any existing PIT on Hj will be overwritten. The application is then restarted by the cluster on a server on the backup site depending on cluster failover policy, STEP 1322.

Returning to INQUIRY 1318, if the data on Sj is not to be used, then AMI recommends to the cluster not to bring the resource group online, and therefore, not to restart the application at the recovery site.

Referring back to INQUIRY 1314, if, however, the PIT copy is inconsistent, then an error is provided due to potential data loss. This completes processing of the cluster failover event.

Figure 15:
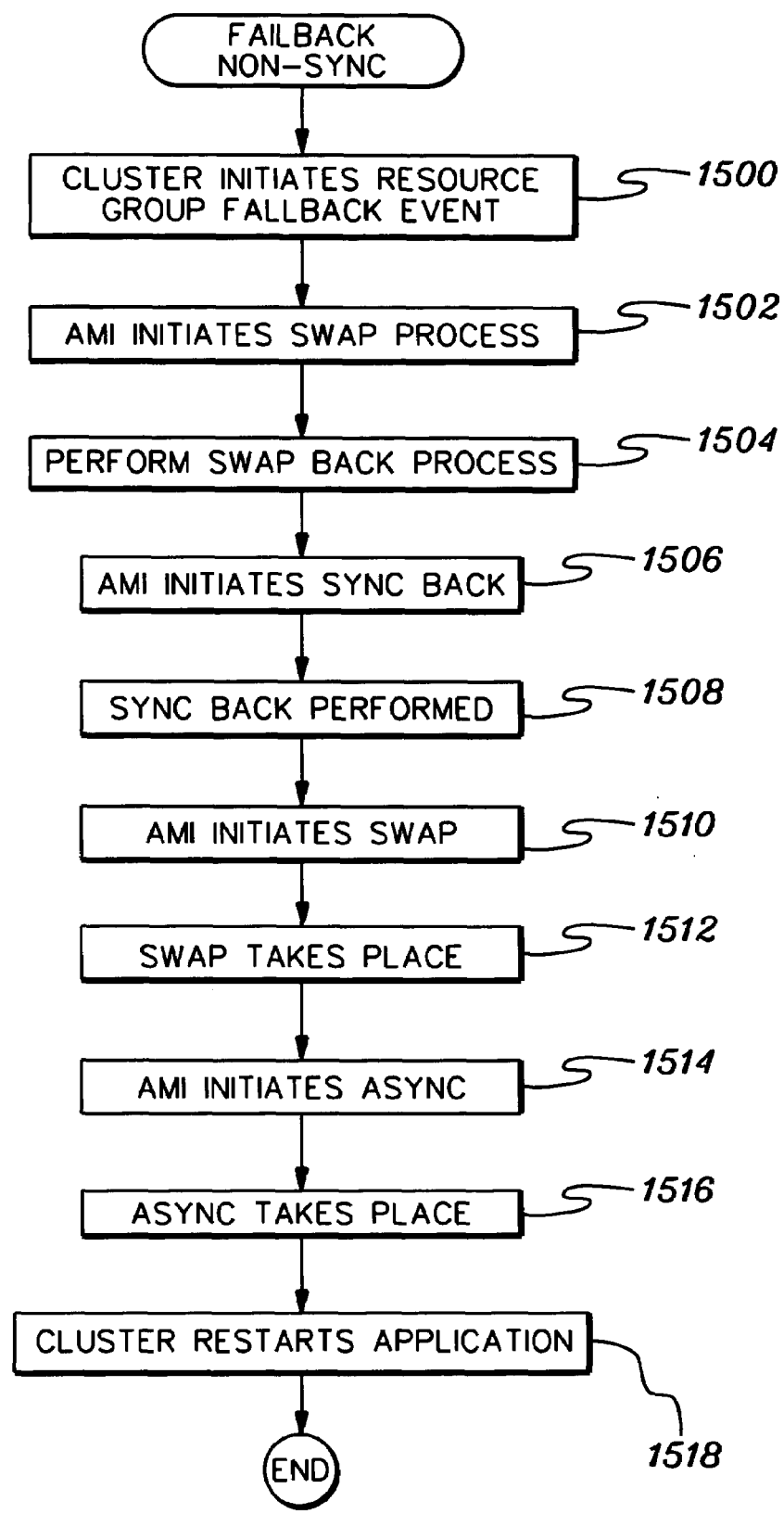
FIG. 15 depicts one embodiment of the logic associated with failback processing for non-synchronous volume sets, in accordance with an aspect of the present invention.

Another event to be processed for non-synchronous volume sets is the failback event processing. One embodiment of the logic associated with this processing is described with reference to FIG. 15. When a resource group is to fall back to the production site, the cluster initiates a resource group fallback event, STEP 1500. This includes, for instance, stopping the application I/O, unmounting the file system, varying offline the volume group, and providing control to AMI. In response to receiving control, AMI initiates eRCMF site swap processing, STEP 1502. As part of this swap processing, AMI determines the state of the volume sets and invokes eRCMF to perform a swap back process, STEP 1504.

In the swap back process, AMI receives control again, determines the states and initiates an eRCMF sync back to the original site, STEP 1506. In response to receiving this command from AMI, eRCMF establishes logical paths and performs a PPRC full copy Hj to Si, STEP 1508. Thereafter, AMI issues another query and initiates a swap of production back to the original site, STEP 1510. In particular, when InSync again, AMI initiates the eRCMF swap of production back to the original site. When eRCMF receives this command, the swap takes place, STEP 1512. In one example, this includes terminating the PPRC pairs, reversing the path, if one-way; performing flashcopy from Hj to Sj 1402 (FIG. 14) and from Si to Hi 1404; re-establishing PPRC pairs in the original direction (Hi to Sj) no copy; and once InSync, again, swapping, by eRCMF, production back to the original site.

Thereafter, AMI initiates async VolumeSet to bring the extended volume set back to default mode, STEP 1514, and in response to this initiation, eRCMF performs the async, STEP 1516. Subsequently, the cluster restarts the application I/O on the original site, STEP 1518. This completes the fall back event processing for non-synchronous volume sets.

In accordance with an aspect of the present invention, in order to enable communication between the cluster software and AMI, the cluster software is modified to use the AMI APIs. For instance, clgetERCMFdisks, clfreleaseERCMFdisks and cljoinERCMFcleanup APIs are included in the disk processing section of the software stack. This allows the cluster software to call AMI.

Moreover, in order to enable communication between the Automation Management Interface and the eRCMF software, a wrapper, referred to as clrunERCMFcmd, is provided. The wrapper submits calls to the eRCMF server through the eRCMF command line interface. The clrunERCMFcmd takes an eRCMF action and invokes the eRCMF client executing. In one example, it is a wrapper for the eRCMF RepMgrCommand CLI.

One example of the syntax of the clrunERCMFcmd is, as follows:

| clrunERCMFcmd <command> <VolumeSet Name> | |
|---|---|
| <command> | can be any one of the following including the actions taken by the eRCMF state machine in response to the commands, depending on the state. |
| check | Check the consistency of the volume set. |
| display | Display the current status and volumes of the volume set. |
| getstate | Display the state of a volume set. |
| sync | Resynchronize the sites, Force Sync mode PPRC. |
| resync | Resynchronize the sites. |
| recover | Recover at the backup site. |
| swap | Swap the production and backup sites. |
| split | Split the sites. |
| flash | A utility for exploiting FlashCopy. |
| forceswap | Swap sites for cluster failure. |
| VolumeSet name> The name of the VolumeSet against which a command is executed. | |

This wrapper facilitates invocation by AMI of commands to be executed by eRCMF. For instance, AMI executes clrunERCMFcmd which performs the following operations, as one example:

It invokes clgetERCMFpcminfo (described below) to determine the active eRCMF server;

It establishes a TCP/IP connection with the PCM executing the active eRCMF server;

It determines the parameters needed by the eRCMF RepMgrCommand CLI making use of the eRCMF information stored in the operating system's registry. As one example, the volume set name provided with clrunERCMFcmd is used to obtain the parameters from the registry;

It runs the eRCMF RepMgrCommand with these parameters and the command provided with the clrunERCMFcmd.

One example of the syntax of RepMgrCommand is as follows:

| RepMgrCommand <Parameter> Command; | |
|---|---|
| -?, -h[elp] | Prints this message. |
| -host host name | Specifies the name of the host that eRCMF is running on, default is local host. |
| -p[assword] pswd | Specifies the password for the user id. |
| -port port number | Specifies the port to connect to. |
| -s[ession] VSname | Specifies the VolumeSet that the command is to be executed against. |
| -u[ser] userid | Specifies the user id executing the command. |
| -v on\|off\|text | Set verbose on (values returned are displayed without text translation), |
| off | (Display nothing.) |
| ext | (Translate message into text), default is on. |
| Command is the eRCMF command to be executed. | |

As described above, the Automation Management Interface uses a utility referred to as clgetERCMFpcminfo to query the eRCMF Productivity Center Machine to determine whether the eRCMF daemon is active. No parameters are provided with this utility. This utility queries the IP address of the primary PCM. If the IP address exists, it runs an eRCMF query command. A successful run of the query command returns the IP address of the primary PCM as the active IP address. If the command fails, it queries the secondary PCM IP address. If that run is successful, it returns the IP address of the secondary PCM as the active IP address; otherwise, it fails. This IP address can then be used by any logic that needs the active IP address.

AMI may also use clwait4ERMCFstate to wait for an expected eRCMF state to be reached after an eRCMF action has been executed. One example of the syntax associated with clwait4ERCMFstate is, as follows:

clwait4ERCMFstate<VolumeSet><state> where state is a desired eRCMF VolumeSet state after an eRCMF command is executed.

This utility queries the state of the volume set, compares the state obtained with the state provided as a parameter on the command, which is the desired state, and if the states are equal, it returns a code indicating success. If the states are unequal, then it keeps querying until, for instance, the states are equal.

In another aspect of the present invention, the Automation Management Interface is used in an AIX environment with the HACMP cluster software offered by International Business Machines Corporation, Armonk, N.Y. In such an environment, cluster verification and synchronization is used. For example, a cluster verification tool, clverifyERCMFconfig, is used to process the verification of the eRCMF configuration information in the cluster configuration. By issuing clverifyERCMFconfig (no parameters are provided), the eRCMF definition stored in an AIX registry, referred to herein as the AIX ODM registry, is verified.

In addition to the above, a set of commands are also provided for defining the eRCMF configuration for cluster management in an AIX environment into the ODM. Examples of these commands are as follows:

1. claddercmf

Adds an eRCMF-Managed PPRC replicated resource to HACMP and stores the data in a dataset, such as in HACMPercmf. One example of the syntax for claddercmf is as follows:

| claddercmf -n <name> -t <volume_type> -p <production_site> | |
|---|---|
| name | The name of the volume set (up to 20 characters). |
| volume_type | The mode: NOFCPY (No Flashcopy at both sites) or ALLFCPY (Both sites have Flashcopy volumes defined), XDNOFCPY, XDALLFCPY. |
| production_site | The initial production site for this volume set. |

2. clchercmf

Changes the definition of an eRCMF PPRC replicated resource. One example of the syntax for clchercmf is as follows:

| clchercmf -n <name> -N <new_name> -t <volume_type> -p <production_site> | |
|---|---|
| name | The name of the volume set (up to 20 characters). |
| new_name | The new ercmf replicated resource name of the volume set (up to 20 characters). |
| volume_type | The volume set mode: NOFCPY (No Flashcopy at both sites) or ALLFCPY (Both sites have Flashcopy volumes defined), XDNOFCPY, XDALLFCPY. |
| production_site | The initial production site for this VolumeSet. |

3. cllsercmf

Lists a defined eRCMF-managed volume set in a dataset, referred to as HACMPercmf. One example of the syntax for cllsercmf is as follows:

cllsercmf[-n<name>][-c][-a][-h]

If no VolumeSet name is specified, the names of all eRCMF-managed PPRC VolumeSets defined will be listed. If the -a flag is provided, full information about all VolumeSets is displayed. If a specific VolumeSet is provided via the -n flag, information about this VolumeSet only will be displayed. The -c flag displays information in a colon-delimited format. The -h flag turns off the display of column headers.

4. clrmercmf

Removes a defined eRCMF-managed volume set from the HACMP configuration. One example of the syntax for clrmercmf is as follows:

| clrmercmf -n <name> | |
|---|---|
| name | The name of the resource to be removed is provided. |

5. cldefercmfglobals

Defines the eRCMF global attributes to HACMP. One example of the syntax for cldefercmfglobals is as follows:

| cldefercmfglobals -a <split_policy> -l <link_type> -f <pri_css> -s <sec_css> -u <ercmf_user> -p <ercmf_password> | |
|---|---|
| split_policy | The action to be taken by eRCMF when a site split occurs. |
| link_type | Indicates whether the PPRC mirrors in one direction or both directions. It has values of: OneWay: PPRC mirrors in only one direction. TwoWay: PPRC mirrors in both directions. |
| pri_css | Enter the name of the Primary Copy Services Server. |
| sec_css | Enter the name of the Secondary Copy Services Server. |
| ercmf_user | Enter the user authentication id on the eRCMF server. This should have been configured on the eRCMF Copy Services Server. |
| ercmf_password | Enter the user authentication password on the eRCMF server. This should have been configured on the eRCMF Copy Services Server. |

6. clchercmfglobal

Makes changes to the eRCMF global attributes defined to HACMP. One example of the syntax for clchercmfglobals is as follows:

| clchercmfglobals -a <split_policy> -l <link_type> -f <pri_css> -s <sec_css> -u <ercmf_user> -p <ercmf_password> |
|---|
| Any of the entries can be changed. |

7. cllsercmfglobals

Lists the eRCMF global attributes to HACMP.
No parameters are provided.

8. clrmercmfglobals

Removes an ercmf global attributes definition from the HACMP configuration.

No parameters are provided.

The aforementioned commands facilitate the defining and maintaining of the eRCMF configuration in an AIX environment. They are used to store the eRCMF information in an operating system registry for access by AMI.

Described in detail above is a capability for automatically determining the state of data and for automatically placing the data in an appropriate state. In one particular example, the capability enables the controlling of eRCMF to support a tier 7 disaster recovery solution. For instance, when a total site failure occurs, an application is restarted on a backup server at the remote site. Prior to restarting the application (which in this context includes the application that the end users interact with, as well as the dependent database software or other middleware), the Automatic Management Interface of one or more aspects of the present invention is called by the cluster software to ensure that the backup disk volumes are in the appropriate state to allow application access. AMI uses eRCMF to discern the state of the ESS at the primary site, and directs the instance of PPRC at the backup site to either track changes (if the primary ESS is unavailable) or reflect them back (if the primary ESS is available). In the latter case, the roles of the primary and backup site have been effectively reversed. Should, at some later time, the primary site be returned to service, and the application restarted there, AMI is again called. If the primary and backup roles were reversed as described above, they are restored. If the primary ESS had been unavailable, delta changes are written to it when it becomes available. In either case, once AMI returns control to the cluster management software, the latest copy of the data is available for application access. This recovery process can be fully automated through use of AMI—no manual intervention or delay is required, as normally the case when eRCMF is used.

The capability of the present invention can be included in many environments, including various clustering and non-clustering environments. In one embodiment, AMI is included in an environment that assumes the existence of a high-availability cluster software, like the IBM eRCMF, the IBM HACMP for AIX or Veritas Cluster Server software solution. The cluster software is expected to provide the means to automate rapid recovery of application services by allowing a workload that was running on one host server to be taken over by another host server. In a single-site cluster environment, the cluster nodes sharing volume groups have physical connects to the same set of disks. In a wide-area environment, the cluster nodes access the same shared volume groups, but the nodes at each site access them from different physical volumes. Data replication technology is used to maintain separate identical local copies of the application data on two separate disk subsystems. When the application is active on the primary server, updates to the application data are automatically replicated to the backup disk subsystem. When a failure occurs and the application is moved to the backup server, it continues its operations using the mirrored data residing on the backup disk system. If the primary server is returned to service, the direction of the data replication can be reversed, such that data updates on the backup disks are replicated to the disks at the primary site, after an initial resynchronization process to bring the primary server up-to-date with any data changes which may have occurred while it was unavailable.

Advantageously, the Automation Management Interface of one or more aspects of the present invention can be integrated into a cluster solution and designed and developed for the automation of the control of eRCMF for the management of replication processing of disk volumes (e.g., ESS disk volumes); coordinate cluster workload management with storage remote mirroring events; enable local clusters to be easily extended to geographically separated locations; enable a cluster software to support a tier 7 disaster recovery solution based around the Enterprise Storage Server or other storage subsystems; automate the failover of PPRC-protected volume pairs between nodes within a site; manage eRCMF to automate failover of PPRC protected-volume pairs between sites; automate failover/reintegration of server nodes attached to PPRC-protected disk volume pairs within and between sites; provide a set of command line interfaces for defining the eRCMF information into a registry, such as the AIX ODM registry, when this interface is used in particular environments, such as AIX; provide cluster verification and synchronization when used with, for instance, the IBM AIX HACMP cluster software; eliminate the need for user involvement for managing eRCMF; and decouple the direct management of eRCMF from cluster management.

Although various embodiments and examples are described herein, many other embodiments and examples may incorporate and/or use one or more aspects of the present invention. For example, one or more aspects of the present invention can be used in non-clustered environments. In a further example, the clustered environment described herein is only one example. The configuration and/or the components of the configuration may be different. One or more aspects of the present invention can be used with other cluster environments. Further, ESS, eRCMF and PPRC are only examples. Other similar techniques may be used. Further, the state of data other than data on disks or volume sets may be determined or managed, in accordance with one or more aspects of the present invention. Many other variations exist and are included within the scope of the present invention.

The capabilities of one or more aspects of the present invention can be implemented in software, firmware, hardware or some combination thereof.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A system of managing replicated storage media of a communications environment, said system comprising:
   means for obtaining control by an entity of the communications environment to determine whether one or more storage media of the replicated storage media are in an appropriate state to allow at least one of application access and data replication;
   means for automatically obtaining by the entity a state of the one or more storage media;
   means for employing, by a resource manager of the communications environment, a policy to determine the choices of where the one or more storage media can be accessible; and
   means for automatically placing the one or more storage media in the appropriate state to allow the at least one of application access and data replication, said means for automatically placing employing at least the obtained state of the one or more storage media and the policy, and wherein the means for automatically placing comprises:
      means for attempting to place the one or more storage media in the appropriate state;
      means for checking in response to the attempting if the one or more storage media are in the appropriate state; and
      means for repeating the attempting and checking, if the one or more storage media are not in the appropriate state;
   wherein the means for automatically obtaining the state comprises means for querying another entity for the state of the one or more storage media,
   wherein the means for automatically placing comprises: means for invoking at least one command to be executed to place the one or more storage media in the appropriate state, the invoking being based at least in part on the obtained state, and
      wherein the means for checking comprises:
      means for querying the state, in response to execution of one or more commands of the at least one command, to determine the state in response to execution; and
      means for executing one or more commands, if the querying indicates the queried state is not the appropriate state.

2. The system of claim 1, wherein the entity comprises an interface and the another entity comprises a copy management facility coupled to the interface.

3. The system of claim 2, wherein the interface obtains control from the resource manager which is coupled to the interface.

4. The system of claim 3, wherein the interface obtains control in response to a failure in the communications environment.

5. The system of claim 4, wherein the communications environment comprises a wide-area cluster environment.

6. An article of manufacture comprising:
   at least one computer usable medium having computer readable program code logic to manage replicated storage media of a communications environment, the computer readable program code logic comprising:
      obtain logic to obtain control by an entity of the communications environment to determine whether one or more storage media of the replicated storage media are in an appropriate state to allow at least one of application access and data replication;
      obtain logic to automatically obtain by the entity a state of the one or more storage media;
      employ logic to employ, by a resource manager of the communications environment, a policy to determine the choices of where the one or more storage media can be accessible; and
      place logic to automatically place the one or more storage media in the appropriate state to allow the at least one of application access and data replication, said place logic employing at least the obtained state of the one or more storage media and the policy, and wherein the place logic comprises:
- attempt logic to attempt to place the one or more storage media in the appropriate state;
- check logic to check in response to the attempt if the one or more storage media are in the appropriate state; and
- repeat logic to repeat the attempt and the check, if the one or more storage media are not in the appropriate state;

wherein the obtain logic comprises query logic to query another entity for the state of the one or more storage media, wherein the place logic comprises:

invoke logic to invoke at least one command to be executed to place the one or more storage media in the appropriate state, the invoking being based at least in part on the obtained state, and wherein the check logic comprises:
- query logic to query the state, in response to execution of one or more commands of the at least one command, to determine the state in response to execution; and
- execute logic to execute one or more commands, if the querying indicates the queried state is not the appropriate state.

7. The article of manufacture of claim 6, wherein the entity comprises an interface and the another entity comprises a copy management facility coupled to the interface.

8. The article of manufacture of claim 7, wherein the interface obtains control from the resource manager which is coupled to the interface.

9. The article of manufacture of claim 8, wherein the interface obtains control in response to a failure in the communications environment.

10. The article of manufacture of claim 9, wherein the communications environment comprises a wide-area cluster environment.

* * * * *